United States Patent [19]

Hennemann et al.

[11] Patent Number: 6,098,646

[45] Date of Patent: *Aug. 8, 2000

[54] DISPENSING SYSTEM WITH MULTI-PORT VALVE FOR DISTRIBUTING USE DILUTION TO A PLURALITY OF UTILIZATION POINTS AND POSITION SENSOR FOR USE THEREON

[75] Inventors: Thomas L. Hennemann, Cottage Grove; Daniel F. Brady, Eagan, both of Minn.

[73] Assignee: Ecolab Inc., St. Paul, Minn.

[ * ] Notice: This patent is subject to a terminal disclaimer.

[21] Appl. No.: 08/803,194

[22] Filed: Feb. 19, 1997

[51] Int. Cl.⁷ .............................. G05D 7/06; F16K 37/00
[52] U.S. Cl. ................ 137/101.19; 137/554; 137/625.11
[58] Field of Search .......................... 137/3, 554, 625.11, 137/101.19; 251/129.04; 340/686

[56] References Cited

U.S. PATENT DOCUMENTS

| | | | |
|---|---|---|---|
| 3,124,162 | 3/1964 | Cameron | 137/625.11 |
| 3,550,627 | 12/1970 | Alexander | 137/625.46 |
| 3,633,623 | 1/1972 | Perry et al. | 137/625.46 |
| 4,156,437 | 5/1979 | Chivens et al. | 137/554 |
| 4,310,022 | 1/1982 | Cohen | 137/624.18 |
| 4,366,839 | 1/1983 | Slavin | 137/625.11 |
| 4,501,297 | 2/1985 | Baker | 137/625.11 X |
| 5,105,851 | 4/1992 | Fogelman | 137/625.11 |
| 5,118,418 | 6/1992 | Roussel | 210/278 |
| 5,127,429 | 7/1992 | Kempf et al. | 137/240 |
| 5,203,366 | 4/1993 | Czeck et al. | 137/3 |
| 5,345,968 | 9/1994 | Day | 137/625.46 |
| 5,584,327 | 12/1996 | Thomas et al. | 137/625.11 X |
| 5,746,238 | 5/1998 | Brady et al. | 137/3 |

*Primary Examiner*—John Rivell
*Attorney, Agent, or Firm*—Merchant & Gould P.C.

[57] ABSTRACT

A dispensing system for dispensing chemical products to a plurality of utilization points utilizes a multi-port valve to selectively deliver use dilutions from a mixing apparatus to selected utilization points. The multi-port valve utilizes a position sensor to provide positive proof-of-delivery by detecting the angular position of a rotor relative to a stator in the valve. The position sensor includes opposing annular arrangements of detectable elements and proximity detectors which rotate relative to one another about a common axis in response to rotation of the rotor such that detectable elements are oriented in proximity to a unique combination of proximity detectors at each of a plurality of predetermined angular positions. As a result, unique codes are output from the proximity detectors to positively identify positioning of the rotor at the predetermined angular positions.

35 Claims, 9 Drawing Sheets

DISPENSING SYSTEM WITH MULTI-PORT VALVE FOR DISTRIBUTING USE DILUTION TO A PLURALITY OF UTILIZATION POINTS AND POSITION SENSOR FOR USE THEREON

FIELD OF THE INVENTION

The invention is directed to a dispensing system for forming a use dilution from a chemical product and a diluent and distributing the same to one of a plurality of utilization points, typically for use in the area of dispensing cleaning products to commercial laundry machines. The invention is also directed to the use of a multi-port valve having a proof-of-delivery sensor, typically for use in such a dispensing system to distribute use dilution to selected utilization points.

BACKGROUND OF THE INVENTION

Chemical products such as cleaning compounds are used extensively in many cleaning processes such as commercial laundering, industrial warewashing and housekeeping. In these applications, a number of laundry or dishwashing machines may require one or more chemical products to be delivered at different points in their wash cycles. Initially, individual dispensers were used to deliver single chemical products to individual machines. Due to cost concerns, however, dispensing systems have been developed for selectively delivering a plurality of chemical products to a plurality of utilization points.

In most dispensing systems of this type, chemical products are supplied in concentrated form, e.g., solid, granulated, powdered, or liquid, and are mixed with a diluent such as water to form use dilutions that are thereafter distributed to particular utilization points. Often, the quantity of chemical product delivered must be carefully controlled to ensure optimum cleaning performance. In addition, different use dilutions may need to be separated from one another to prevent incompatible chemical products from reacting with one another. Segregation of use dilutions is typically performed by delivering discrete quantities of diluent between use dilutions to "flush" any residual use dilutions from the system.

Many conventional designs utilize a mixing apparatus having a mixing manifold with a diluent input coupled to an diluent supply and a plurality of inputs coupled to a plurality of chemical product sources. Diluent mixes with one or more chemical products in the mixing manifold to form a use dilution, and a delivery pump coupled to the output of the manifold delivers the use dilution out of the mixing manifold.

Diluent is typically supplied by line pressure and is controlled via a valve. The chemical products may be supplied by individual pumps, or alternatively, each chemical product source may be coupled to the manifold through a valve, such that operation of the delivery pump simply draws chemical product into the manifold.

The use dilution delivered by the delivery pump is typically distributed to individual utilization points using a diverter manifold having a plurality of outputs with individual control valves for each output. However, the use of a diverter manifold with individual output valves presents several problems.

The use of multiple valves adds cost and complexity to the dispensing system, as well as increases the size of the dispensing system. Moreover, proof-of-delivery (POD) verification is difficult to achieve using a multi-valve diverter manifold.

Should an output valve fail in an open position, subsequent deliveries of use dilution to other utilization points may be diverted in part through the failed valve, resulting in an inadequate supply of use dilution.

On the other hand, should an output valve fail in a closed position, damage to the delivery pump may occur since the diverter manifold may potentially be closed at each output. Often, a separate pressure relief valve is required to protect against this situation.

In either case, direct verification of proof-of-delivery (i.e., that only the selected output valve is open in the diverter manifold) is often not possible. An indirect method of verifying proof-of-delivery, such as using individual sensors to detect flow or product presence (e.g., conductivity sensors, pressure switches, flowmeters) at each output, may instead be required. The use of individual sensors, however, is extremely expensive and adds significant size and complexity to the dispensing system.

Therefore, there is a significant need for a manner of reliably distributing use dilutions to a plurality of utilization points which is less expensive, less complex and smaller than conventional diverter manifolds, and which is capable of providing accurate proof-of-delivery verification.

SUMMARY OF THE INVENTION

The invention addresses these and other problems associated with the prior art in providing a dispensing system for dispensing chemical products to a plurality of utilization points in which a multi-port valve is used to selectively deliver use dilutions from a mixing apparatus to selected utilization points. By "multi-port valve", what is meant is a valve having an input and a plurality of outputs, only one of which is coupled to the input at any given time.

Through the use of a multi-port valve instead of a multi-valve diverter manifold, significant savings in terms of costs, complexity and size are obtained. In addition, direct proof-of-delivery verification may be performed simply, reliably and non-invasively by detecting the position of the valve, thereby eliminating the need for individual product presence or flow sensors at each output. Moreover, the input of the multi-port valve is preferably always coupled to at least one of the outputs, thereby protecting from over-pressure situations and eliminating the need for a pressure relief valve.

Preferred multi-port valves utilize a rotatable distribution manifold or rotor disposed over a centrally located first port and an annular arrangement of second ports. The rotor includes a radial passage extending between a central port and a peripheral port separated radially from the central port. The rotor is rotatable to position the peripheral port over one of the plurality of second ports. Further, the rotor is movable axially to seat and unseat the central port with the first port and the peripheral port with one of the second ports, and to thereby couple the first port to one of the second ports. Should the rotor fail to seat, the first port is coupled to all of the second ports, ensuring that the first port is always coupled to at least one second port.

Preferred multi-port valves also incorporate a unique position sensor design to further ensure accurate proof-of-delivery verification. The position sensor includes an annular arrangement of proximity detectors in an opposing coaxial relationship with an annular arrangement of detectable elements. The annular arrangements are rotatable relative to one another in conjunction with rotation of the rotor. The proximity detectors and detectable elements are positioned at predetermined angular positions such that selected detectable elements are oriented in proximity to selected proximity detectors to activate unique combinations of proximity detectors at selected angular positions of the rotor (preferably the positions of the second ports).

Moreover, in preferred embodiments, the combinations of all but one of the proximity detectors activated at a given angular position are unique with respect to the combinations of all or all but one of the proximity detectors activated at other angular positions. Consequently, proof-of-delivery verification may be obtained even in the event of the failure of one proximity detector. Moreover, in many instances the inoperative proximity detector may be identified and reported to an operator for repair.

Therefore, in accordance with one aspect of the invention, there is provided a dispensing system for dispensing chemical products to a plurality of utilization points. The system includes a mixing apparatus, coupled to a source of diluent and a plurality of sources of chemical products, the mixing apparatus outputting a use dilution having at least one of the plurality of chemical products mixed with diluent; a multi-port valve having an input in fluid communication to receive a use dilution from the mixing apparatus and a plurality of outputs coupled to the plurality of utilization points, the multi-port valve being movable between a plurality of positions, each position coupling the input to one of the plurality of outputs; and a controller, coupled to the mixing apparatus and the multi-port valve, for selectively dispensing a use dilution to one of the plurality of utilization points.

In accordance with another aspect of the invention, there is provided a method of dispensing chemical products to a plurality of utilization points. The method includes the steps of forming a use dilution from a diluent and at least one chemical product; selecting one of a plurality of utilization points by rotating a multi-port valve to place an input thereof in fluid communication with one of a plurality of outputs coupled to the plurality of utilization points; and directing the use dilution through the input of the multi-port valve to the one of the plurality of utilization points.

According to a further aspect of the invention, a multi-port valve is provided, which includes a housing; a stator, disposed within the housing, and including a first port and a plurality of second ports disposed in an annular arrangement around the first port; a rotor, rotatably mounted within the housing, and including a central port in fluid communication with a peripheral port, the central port facing the first port of the stator, and the peripheral port facing one of the second ports of the stator; a drive mechanism, coupled to the rotor, for rotating the rotor to position the peripheral port at a selected one of the second ports to thereby place the first port in fluid communication with the selected second port; and a position sensor for sensing one of a plurality of predetermined angular positions of the rotor. The position sensor includes a plurality of detectable elements disposed in an annular arrangement at predetermined angular positions; and a plurality of proximity detectors disposed in an annular arrangement at predetermined angular positions, wherein the detectable elements and the proximity detectors are rotatable relative to one another and about a common axis in response to rotation of the rotor such that detectable elements are oriented in proximity to a unique combination of proximity detectors at each predetermined angular position.

According to an additional aspect of the invention, there is provided a position sensor for sensing one of a plurality of predetermined angular positions of a first member rotatably coupled to a second member. The position sensor includes a plurality of detectable elements disposed in an annular arrangement on one of the first and second members; and a plurality of proximity detectors disposed in an annular arrangement on the other of the first and second members, wherein the detectable elements and the proximity detectors are rotatable relative to one another about a common axis in response to rotation of the first member relative to the second member such that detectable elements are oriented in proximity to a unique combination of proximity detectors at each predetermined angular position.

These and other advantages and features, which characterize the invention, are set forth in the claims annexed hereto and forming a further part hereof. However, for a better understanding of the invention, and of the advantages and objectives attained thereby, reference should be made to the Drawing, and to the accompanying descriptive matter, in which there is described preferred embodiments of the invention.

DETAILED DESCRIPTION OF THE PREFERRED EMBODIMENTS

Figure 1:
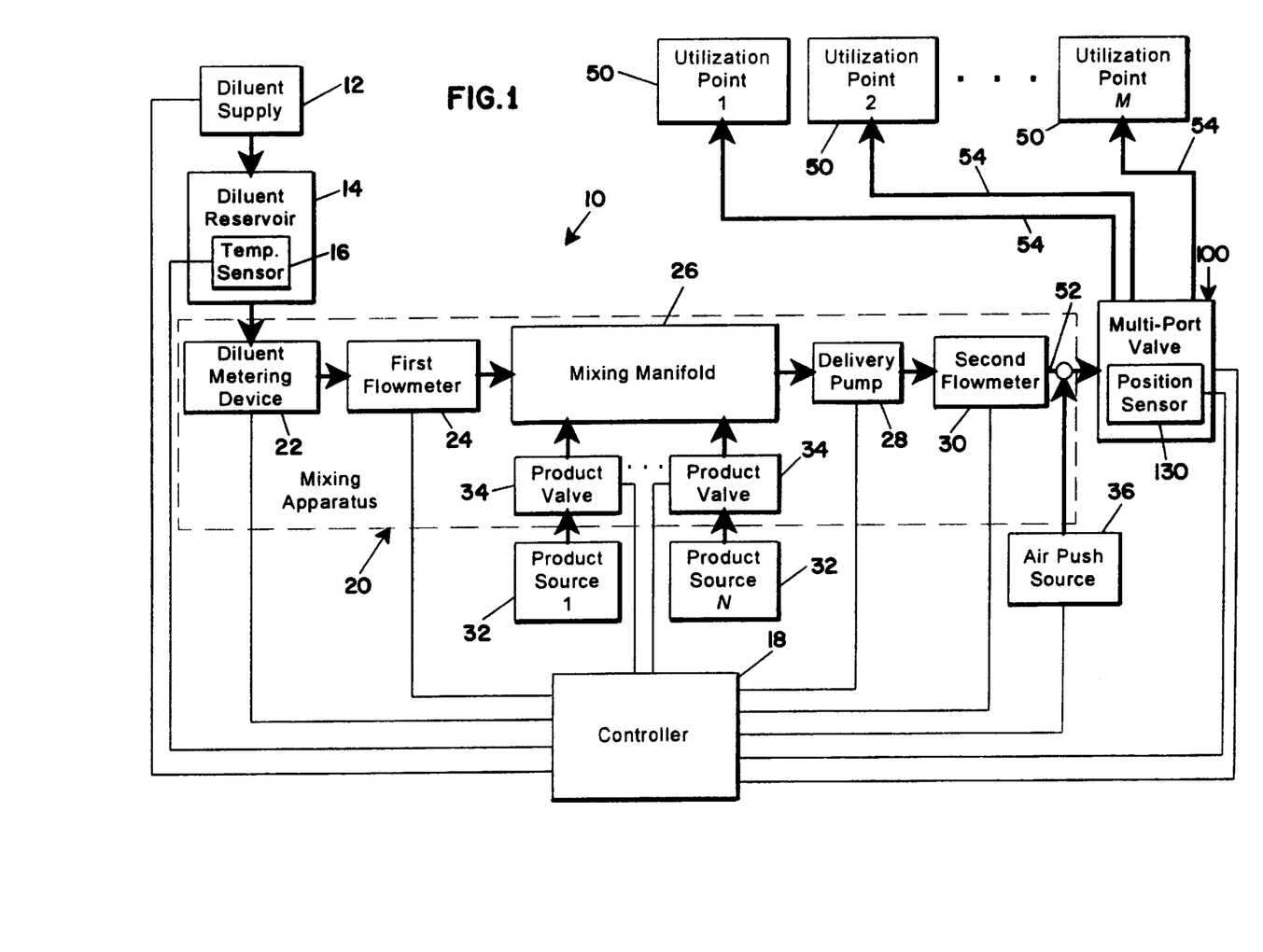
FIG. 1 is a block diagram of a preferred dispensing system consistent with the principles of the invention.

Turning to the Drawing, wherein like numbers denote like parts throughout the several views, FIG. 1 illustrates a preferred dispensing system 10 consistent with the principles of the present invention. Briefly, dispensing system 10 includes a mixing apparatus 20 which forms use dilutions from diluent supplied by a diluent supply 12 and chemical products from one or more of a plurality of chemical product sources 32. Mixing apparatus 20 delivers use dilutions to a multi-port valve 100, which subsequently delivers the use dilutions to one of a plurality of utilization points 50, which are preferably the wash zones of laundry machines. Control over mixing apparatus 20, multi-port valve 100 and the other components shown in system 10 is provided by a controller 18.

With the primary exception of multi-port valve 100 which replaces a conventional diverter manifold, the other components in dispensing system 10, particularly as relating to the mixing apparatus, may be the same or similar to the preferred dispenser systems disclosed in U.S. patent application Ser. No. 08/414,635 to Daniel F. Brady et al., which was filed on Mar. 31, 1995, and which is incorporated by reference herein. The reader is referred to Brady et al. for a more complete disclosure of these various components. It should be appreciated that any of the alternative dispensing system components and configurations disclosed in Brady et al., however, may also be utilized in connection with the present invention.

The preferred dispensing system is preferably used to dispense one or more cleaning chemical products in diluted form as use dilutions to a plurality of utilization points. For the preferred embodiment, the utilization points may include laundry machines with zones in which washing occurs, dishwashing machines, or other cleaning devices that utilize cleaning chemical products (e.g., in housekeeping, food and beverage, commercial or institutional laundering, and industrial warewashing). The dispensed use dilutions may contain, for example, solid, powdered and liquid detergents; thickened aqueous detergent dispersions, viscous aqueous detergents, strippers, degreasers, souring agents, alkali metasilicates, alkali metal hydroxides, sequestering agents, enzyme compositions (lipolytic, proteolytic, etc.), threshold agents, dye, optical brightener, nonionic surfactant, anionic surfactant, fragrance, alkali carbonates, iron control agents, defoamers, solvents, cosolvents, hydrotropes, rinse aids, bleach, and/or fabric softeners. In one preferred laundry environment, detergent, bleach, souring agent, blueing agent, and fabric softener may be utilized sequentially.

While the preferred embodiment is uniquely suited for use in dispensing cleaning chemical products to laundry machines in a commercial or institutional environment, it will be appreciated that the principles of the invention may also benefit other applications in which chemical products are dispensed to multiple utilization points. Therefore, the invention should not be limited to the particular embodiments disclosed herein.

Dispensing System

As discussed above, dispensing system 10 includes a mixing apparatus 20 and multi-port valve 100, both of which are under the control of controller 18.

Mixing apparatus 10 receives diluent from a diluent reservoir 14 which is supplied with hot and cold diluent (preferably tap water) through a diluent supply 12. The control valves may be separately controlled by controller 18 to vary the temperature of the diluent, or may be coupled through a single tempering valve that is controlled by controller 18. Feedback concerning the temperature of the diluent in reservoir 14 is provided by a temperature sensor 16 mounted therein and coupled to controller 18. In addition, high and low level sensors may also be provided in reservoir 14 to permit controller 18 to maintain an appropriate amount and temperature of diluent in the reservoir at all times.

Diluent is supplied to mixing apparatus 20 at a metered rate by diluent metering device 22, which is also controlled by controller 18. As discussed in Brady et al., diluent metering device 22 is preferably a parallel coupling of diluent entry valves having different sized metering orifices to permit variable flow by actuating one or more of the valves at a time. In the alternative, diluent metering device 22 may be another variable metering device such as a throttling valve, a variable diameter orifice, a pinch tube, a needle valve, etc.

Diluent flow is measured by a first flowmeter 24 which provides a feedback signal to controller 18. Flowmeter 24 may be a turbine flowmeter or other suitable flow measuring device. Flowmeter 24 outputs diluent into a mixing manifold 26. In addition, a number (1 . . . N) of chemical product sources 32 output chemical products into manifold 26 through individual normally closed product valves 34 under the control of controller 18. Any number of chemical products may be dispensed into mixing manifold 26 as desired to mix with diluent and form use dilutions therefrom.

A delivery pump 28, which is preferably a high volume gear pump, draws use dilutions from mixing manifold 26 and through a second flowmeter 30 (preferably a turbine flowmeter) to line 52 which exits mixing apparatus 20. In addition, an air push source 36 (e.g., plant air or a compressed air tank) is coupled to line 52 to deliver use dilutions more rapidly, with reduced amounts of diluent, and with more controlled dilution ratio.

In operation, a predetermined amount of diluent is supplied from diluent metering device 22 and delivered to multi-port valve 100 by delivery pump 28 to perform a preflush operation. Multi-port valve 100 is positioned to select one of the utilization points for delivery of the pre-flush diluent.

Next, a use dilution is formed in mixing manifold 26 by selecting an appropriate diluent delivery rate with diluent metering device 22, opening the product valve or valves 34 corresponding to the desired chemical products, and actuating delivery pump 28. Delivery pump 28 draws chemical products from the selected chemical product sources 32 via reduced pressure in the manifold. The amount of chemical products delivered is monitored by subtracting the measured flow of diluent entering mixing manifold 26 (provided by first flowmeter 24) from the measured flow of use dilution exiting the mixing manifold (provided by second flowmeter 30). In addition, an instantaneous dilution ratio may be measured by comparing readings from flowmeters 24 and 30, thereby permitting the ratio to be modified by diluent metering device 22.

The use dilution exiting mixing apparatus 20 is fed from line 52 to multi-port valve 100 (discussed in greater detail below) for distribution to one of the utilization points 50. Preferably, once a desired quantity of use dilution is delivered by mixing apparatus 20, all product valves 34 are closed and a predetermined amount of diluent is supplied through line 52 to deliver all of the use dilution to multi-port valve 100. An air push is then performed by opening a valve in air push source 36 to complete delivery of use dilution to the desired utilization point.

Various modifications may be made to dispensing system 10 consistent with the invention. For example, multiple mixing apparatus may be utilized and coupled through a common multi-port valve for distribution to the utilization points. Multiple mixing apparatus may be desirable when incompatible chemical products are used, or if separate high and low volume use dilutions are required, whereby a larger volume delivery pump might be used in an additional mixing apparatus. Other modifications will be apparent to one skilled in the art.

Multi-Port Valve

Figure 2:
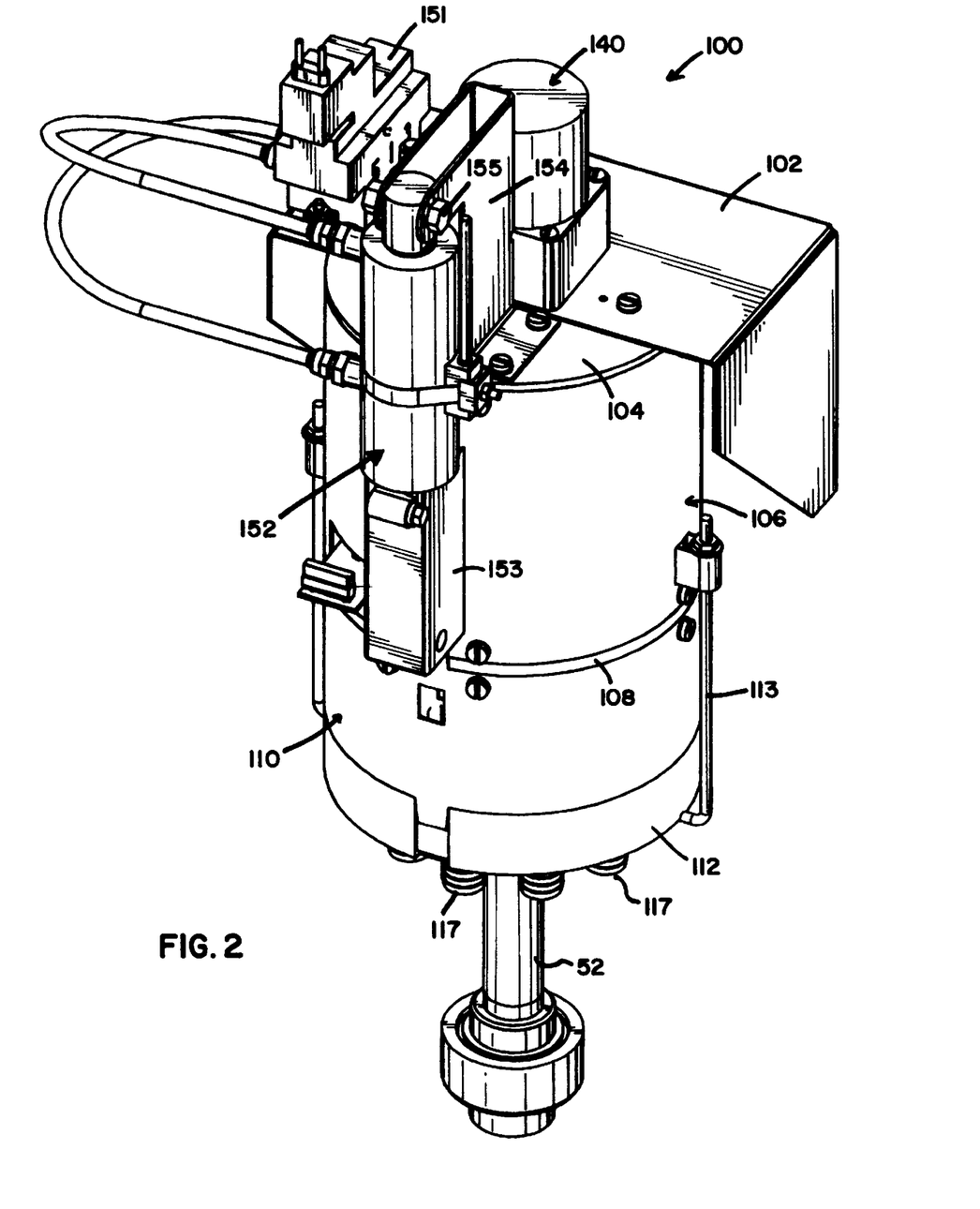
FIG. 2 is a perspective view of a preferred multi-port valve in the preferred dispensing system of FIG. 1.
Figure 3:
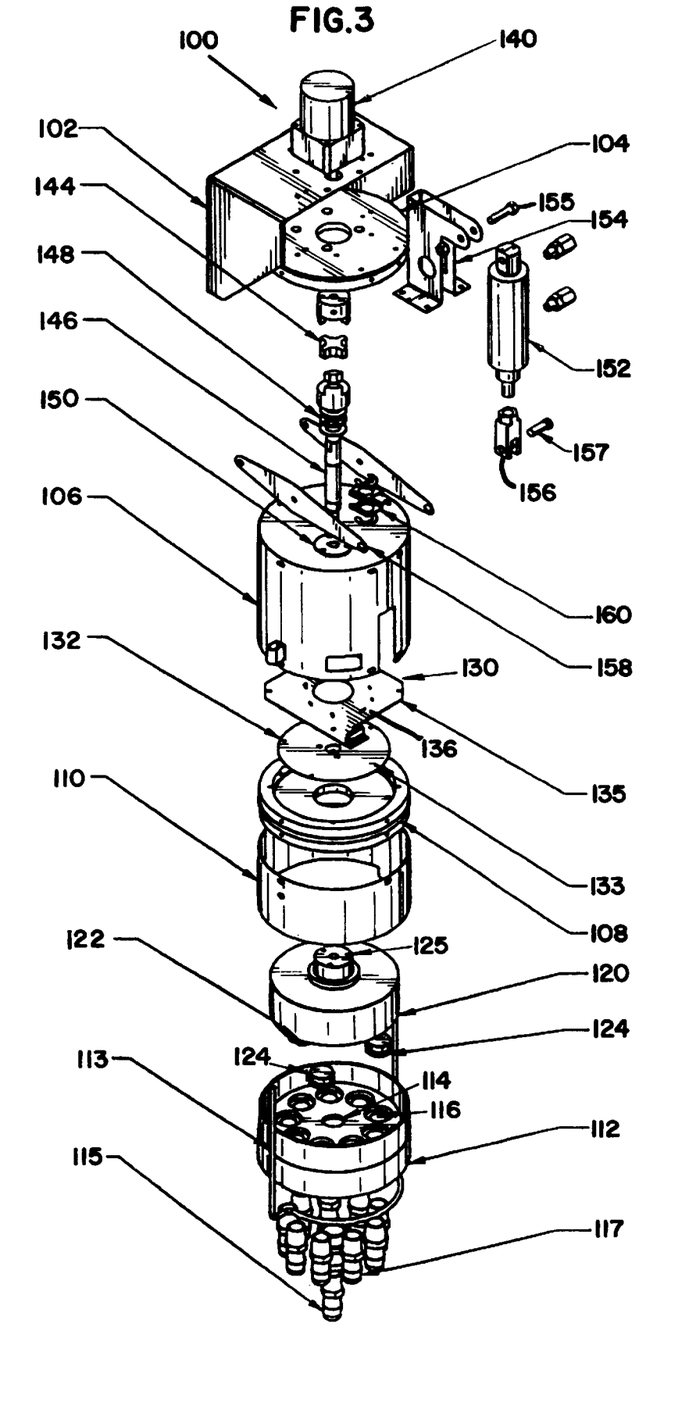
FIG. 3 is an exploded perspective view of the preferred multi-port valve of FIG. 2.

Multi-port valve 100 is shown in greater detail in FIGS. 2 and 3. Multi-port valve 100 includes a housing with an upper wrap 106 housing the electrical and mechanical components of the valve, and a lower wrap 110 housing the fluid delivery components of the valve. A top end cap 104 seals off the top of upper wrap 106, and a lower end cap 112 seals off the bottom of lower wrap 110. A middle cap 108 joins and partitions upper wrap 106 and lower wrap 110. The housing is secured together by a bale 113, and may be mounted to a wall or other similar structure by a mounting bracket 102.

Lower end cap 112 forms a stator for the valve and houses a centrally disposed input port 114 which is coupled by a hose barb 115 to line 52 of mixing apparatus 20. In addition, an annular arrangement of output ports 116 are disposed in lower end cap 112, each of which is preferably coupled by a hose barb 117 to a line 54 leading to a utilization point 50. Preferably, nine output ports 116 are provided in lower end cap 112, eight of which lead to washing machines, with the ninth leading to a drain.

Figure 4A:
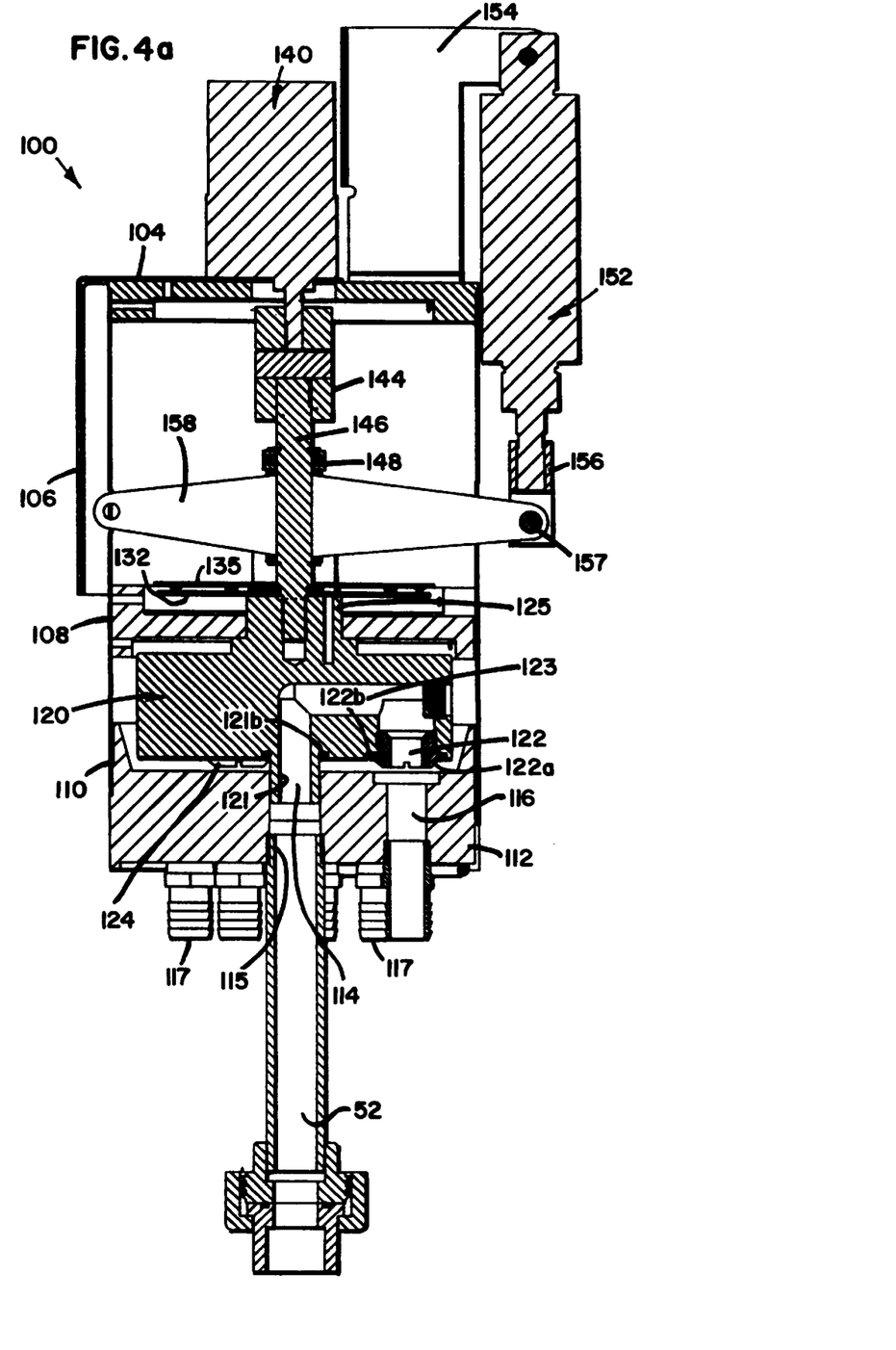
FIG. 4(a) is a cross-sectional view of the preferred multi-port valve in an unseated position, taken along line 4—4 of FIG. 2.
Figure 4B:
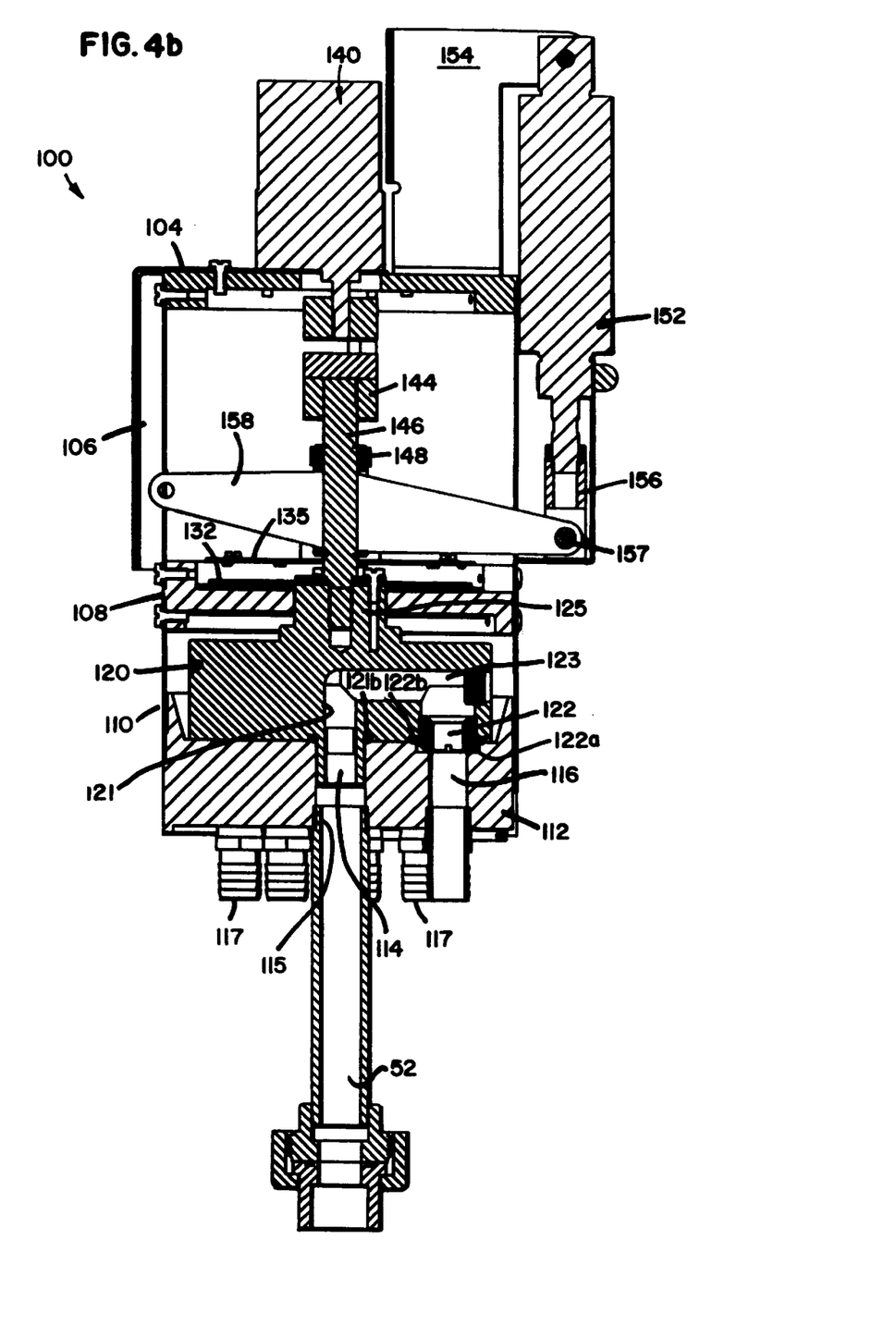
FIG. 4(b) is a cross-sectional view of the preferred multi-port valve in a seated position.

A distribution manifold or rotor 120 is disposed over lower end cap 112 with an internal radial passage 123 defined therein between a central port 121 and a peripheral port 122 radially spaced from the central port. Central port 121 is axially aligned with first or input port 114 of lower end cap 112, and peripheral port 122 is positioned such that rotation of rotor 120 selectively aligns port 122 with one of the second or output ports 116. Movement of rotor 120 axially seats central port 121 with input port 114 and seats peripheral port 122 with a selected one of the output ports 116 to place input port 114 in fluid communication with the selected output port 116 through passage 123. As shown in FIGS. 4(a) and 4(b), for example, central port 121 extends into and forms a seal with input port 114 through gasket 121b. Peripheral port 122 includes a tapered portion 122a with gasket 122b that seats with and forms a seal with one of the output ports 116.

A pair of alignment tips 124 are also aligned with output ports 116, but are arcuately spaced at 120 degree intervals from peripheral port 122 such that tips 124 and port 122 are evenly spaced about the circumference of rotor 120. Alignment tips 124 also seat in additional output ports 116 spaced 120 degrees from the selected output port to assist in the alignment of peripheral port 122 with the selected output port.

Rotation of rotor 120 is provided by a drive mechanism including a motor 140 coupled to rotor 120 through a shaft 146. Motor 140 is preferably a stepper motor, such as the No. PH266 available from Oriental Motor Company.

Shaft 146 is coupled to motor 140 through a coupler 144 and thrust bearing 148. Coupler 144 allows shaft 146 to move axially between raised and lowered positions, and which permits motor 140 to rotate shaft 146 when the shaft is in a raised position. A drive washer 150 couples shaft 146 to a coupling 125 on rotor 120 to rotate the rotor between sensor positions.

Axial movement of rotor 120 is provided by a rotor lift mechanism including an air cylinder 152 coupled to an air tank or other suitable source of plant air pressure through an air valve 151 (FIG. 2). A first end of air cylinder 152 is mounted in a fixed position on top end cap 104 through an upper mount 154, with a pivotable connection supplied through pin 155. A second end of air cylinder 152 is coupled to first ends of a pair of lever arms 158 through coupling 156 and pin 157 (FIG. 3). This assembly is covered by housing 153 (FIG. 2).

Second ends of lever arms 158 are secured through a pivotable connection to opposing sides of upper wrap 106. Lever retainers 160 couple lever arms 158 to shaft 146, preferably proximate midpoints of the lever arms. Through this linkage, actuation of air cylinder 152 between retracted and extended positions moves the shaft between its raised and lowered positions, and consequently moves the rotor between its unseated position (shown in FIG. 4(a)) and its seated position (shown in FIG. 4(b)). In the alternative, other mechanisms, e.g., hydraulic valves, solenoids, etc. may be used to move rotor 120 axially. In addition, a spring or other passive mechanism may be used to bias the rotor to one of its positions in the absence of power to the valve.

Returning to FIG. 3, a position sensor 130 is also provided on multi-port valve 100 to directly detect the angular position of rotor 120. A magnet disk or wheel 132 is mounted to rotor 120 and shaft 146 by drive washer 150 such that the disk rotates cooperatively with the rotor but is segregated from the fluid delivery portion of the valve by middle cap 108. A plurality of magnets or other detectable elements 133 are disposed in an annular arrangement around the periphery of disk 132 at predetermined angular positions (as discussed below). A wiring board 135, with a plurality of proximity detectors 136, is mounted in a fixed position within upper wrap 106. Detectors 136 are preferably Hall-effect detectors which are capable of detecting magnets 133 on disk 132 (as also discussed below). It will be appreciated that other proximity detectors, e.g., mechanical switches, optical switches and sensors, etc. may be used in the alternative, and that other position sensors, e.g., angular sensors, encoder wheels, switches and the like, may also be used in the alternative to determine the angular position of multi-port valve 100. Moreover, either the detectable elements or the proximity detectors may be mounted for cooperative rotation with the rotor, as long as relative rotation therebetween is provided.

Detectors 136 preferably perform the dual function of determining both the angular position of rotor 120, as well as the axial position of the rotor between its unseated and seated positions. The angular position is preferably determined by detecting the combination of detectors 136 that sense magnets 133. The axial position is preferably determined by detecting if any of detectors 136 sense a magnet, since disk 132 is moved axially away from wiring board 135 when rotor 120 is in the seated position (e.g., as shown in FIG. 4(b)). In the alternative, a separate sensor may be used to positively determine when the rotor is in its unseated and seated positions.

Figure 5A:
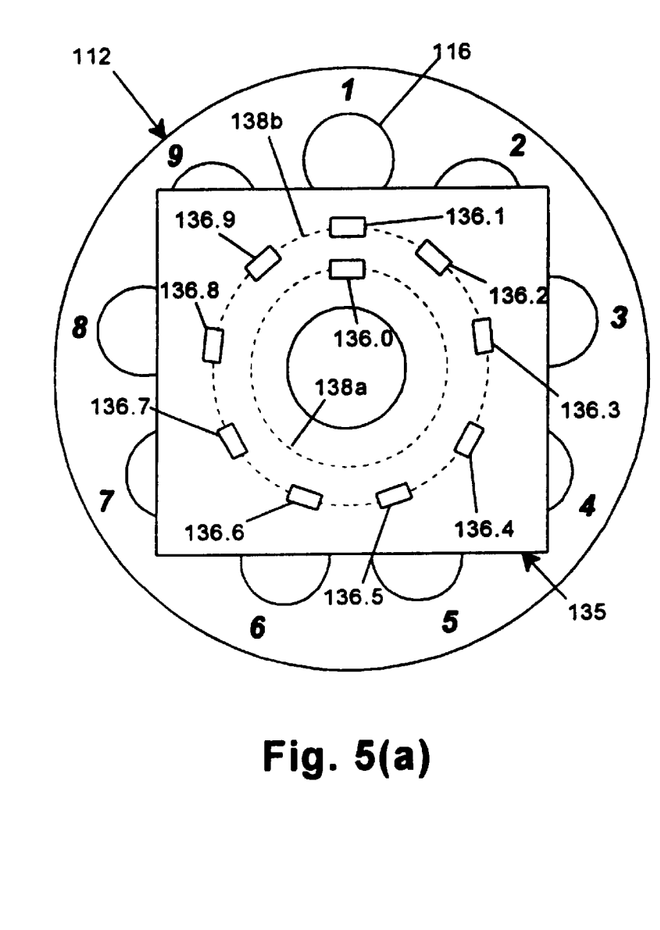
FIG. 5(a) is a functional top plan view of the wiring board in the position sensor on the preferred multi-port valve of FIG. 2, illustrating the relative location of the proximity detectors to the output ports.
Figure 5B:
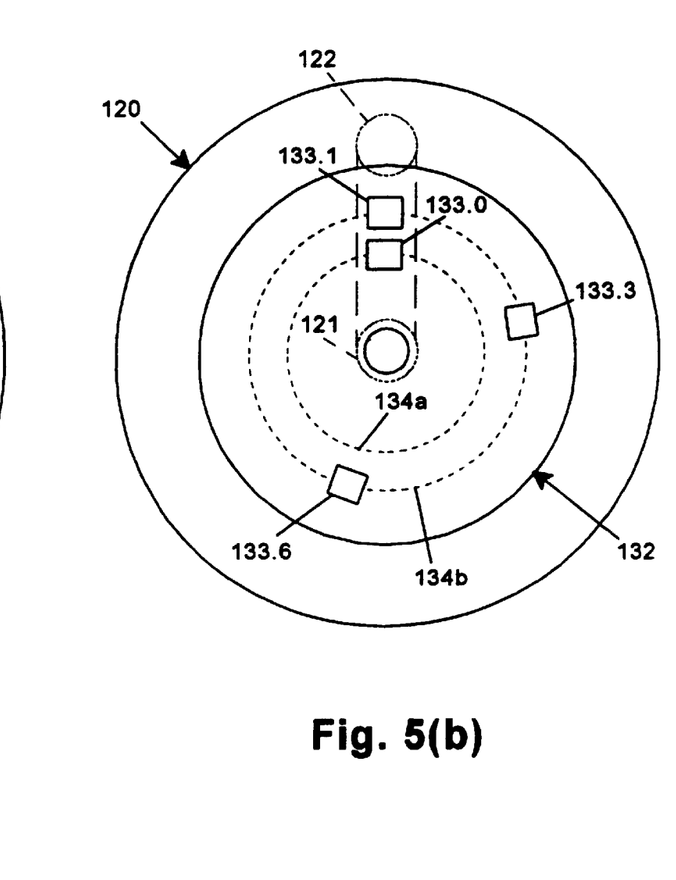
FIG. 5(b) is a functional top plan view of the magnetic disk in the position sensor on the preferred multi-port valve of FIG. 2, illustrating the relative location of the rotor to which the disk is connected.

As shown in FIGS. 5(a) and 5(b), the preferred relative positioning of proximity detectors on wiring board 135 and magnets 133 on magnetic disk 132 is shown for providing a fault tolerant system of detecting the position of rotor 120. As can be seen from these figures, proximity detectors 136.1–136.9 are preferably evenly spaced around board 135 in an annular arrangement at a radius 138b, with one detector for every desired angular position to detect, here a port position (i.e., with detector 136.x at port x). Magnets 133.1, 133.3 and 133.6 are spaced over selected ports at radius 134b to generate unique patterns for detectors 136.1–136.9 throughout the full rotation of disk 132. It should be appreciated that any number of detectors and detectable elements may be used, typically with a lesser number of detectable elements than detectors so that combinations of detectors are activated at different angular positions. Moreover, more than one detector may be used for each port position.

For the discussion below, it will be assumed that a port is a discrete angular position numbered 1 . . . n, where n is the number of ports or positions. The position of a magnet is assumed to be the port number over which the magnet is disposed when rotor 120 is in a home position over port one.

In general, to ensure fault tolerance of being able to detect position in the event of the failure of one detector, two out of three voting is preferably used, i.e., where if at least two out of three tests (here detecting a magnet) indicate that a condition (here a particular angular position) is true, the condition is assumed as true even if the third test does not indicate such. In addition, a minimum of five ports must be used (three for voting, and two for the pattern). There is no limit, however, on the maximum number of ports. Also, the on-off pattern of proximity detectors (where "on" reflects a magnet disposed at a position) must not repeat over the span of ports when rotor 120 rotates a full revolution (i.e., 11001 is unique, but 10101 is not, when each is shifted to each possible port position).

For five ports, one suitable pattern is on-on-off-off-on (i.e., with magnets at positions 1, 2 and 5). For more than five ports, a suitable pattern may be obtained by adding together series of on-off combinations, starting with one on and one off, then one on and two offs, then one on and three offs, etc., until the number of ports is reached. Thus, for nine ports, one suitable pattern would be 101001000 (with magnets at positions 1, 3 and 6). It should be appreciated that other patterns exist which would be suitable for use with any given number of ports. For example, another suitable pattern for nine ports which does not follow the above technique is 101010100 (with magnets at positions 1, 3, 5, 7).

Once a pattern is determined, it is preferable to rotate the pattern through each position to verify no repeat in the pattern. In addition, it is preferable to verify no overlap of patterns should any one detector fail (i.e., give a false "0"). This may be performed manually or through the use of a computer.

With no overlap of patterns the combinations of all but one of the proximity detectors activated at any given angular position are unique with respect to the combinations of all or all but one of the proximity detectors activated at other angular positions. Determining whether any patterns repeat in the event of the failure of one detector is optional, and, if desired, it is contemplated that a similar exercise could be performed to provide unique codes even in the event of the failure of two, three or more detectors, although more detectors and detectable elements may be required to provide enough possible combinations to ensure uniqueness in the event of failure of two or more detectors.

It is also desirable to include a separate home detector such as detector 136.0 which is disposed at a second radius 138*a* as shown in FIG. 5(*a*). As shown in FIG. 5(*b*), a single detectable element, magnet 133.0, is also disposed on disk 132 at a second radius 134*a* such that it is detectable when rotor 120 is positioned over the first port (the "home" position). It may be desirable, for example, to designate the first port for the drain, as the home detector permits the home position to be found even in the event of the failure of more than one proximity detector. In addition, it should be appreciated that the home port may be designated with other port numbers, e.g., port 9.

Table I below illustrates the state of each detector 136.0–136.9 for each angular position of rotor 120 (where the current "port" relates to the selected output port 116, over which second port 122 is currently positioned), using one preferred arrangement of magnets 133.1, 133.3 and 133.6 at ports 1, 3 and 6, and home magnet 133.0:

TABLE I

Detector State Chart

| Port | Detector 136.x | | | | | | | | | | Dec. |
|---|---|---|---|---|---|---|---|---|---|---|---|
| | 0 | 1 | 2 | 3 | 4 | 5 | 6 | 7 | 8 | 9 | |
| 1 | 1 | 1 | 0 | 1 | 0 | 0 | 1 | 0 | 0 | 0 | 840 |
| 2 | 0 | 0 | 1 | 0 | 1 | 0 | 0 | 1 | 0 | 0 | 164 |
| 3 | 0 | 0 | 0 | 1 | 0 | 1 | 0 | 0 | 1 | 0 | 82 |
| 4 | 0 | 0 | 0 | 0 | 1 | 0 | 1 | 0 | 0 | 1 | 41 |
| 5 | 0 | 1 | 0 | 0 | 0 | 1 | 0 | 1 | 0 | 0 | 276 |
| 6 | 0 | 0 | 1 | 0 | 0 | 0 | 1 | 0 | 1 | 0 | 138 |
| 7 | 0 | 0 | 0 | 1 | 0 | 0 | 0 | 1 | 0 | 1 | 69 |
| 8 | 0 | 1 | 0 | 0 | 1 | 0 | 0 | 0 | 1 | 0 | 290 |
| 9 | 0 | 0 | 1 | 0 | 0 | 1 | 0 | 0 | 0 | 1 | 145 |

This arrangement of detectors provides a unique binary "code" for each position of rotor 120, with detector 136.0 forming the most significant bit, and detector 136.9 forming the least significant bit. The "Dec." column represents the decimal equivalent code. Redundancy and fault tolerance is also provided by this arrangement because the angular or port position of rotor 120 may still be reliably determined even with the failure of any one detector 136.0–136.9. Table II below shows the codes that would result from the failure (i.e., a false "0" reading) of any single detector 136.0–136.9:

TABLE II

Detector Failure Codes

| Port | none | Failure - Detector 136.x | | | | | | | | | |
|---|---|---|---|---|---|---|---|---|---|---|---|
| | | 0 | 1 | 2 | 3 | 4 | 5 | 6 | 7 | 8 | 9 |
| 1 | 840 | 328 | 584 | 840 | 776 | 840 | 840 | 832 | 840 | 840 | 840 |
| 2 | 164 | 164 | 164 | 36 | 164 | 132 | 164 | 164 | 160 | 164 | 164 |
| 3 | 82 | 82 | 82 | 82 | 18 | 82 | 66 | 82 | 82 | 80 | 82 |
| 4 | 41 | 41 | 41 | 41 | 41 | 9 | 41 | 33 | 41 | 41 | 40 |
| 5 | 276 | 276 | 20 | 276 | 276 | 276 | 260 | 276 | 272 | 276 | 276 |
| 6 | 138 | 138 | 138 | 10 | 138 | 138 | 138 | 130 | 138 | 136 | 138 |
| 7 | 69 | 69 | 69 | 69 | 5 | 69 | 69 | 69 | 65 | 69 | 68 |
| 8 | 290 | 290 | 34 | 290 | 290 | 258 | 290 | 290 | 290 | 288 | 290 |
| 9 | 145 | 145 | 145 | 17 | 145 | 145 | 129 | 145 | 145 | 145 | 144 |

As should be apparent from Table II, even in the event of a failure of a single detector, all of the codes (which represent combinations of activated proximity detectors) possible for any given angular position of the rotor are unique relative to the other positions (i.e., no code is found in more than one row of Table II). Accordingly, by matching a code in the table with a port, position sensor 130 is always capable of reliably distinguishing each port position in the event of a failure of a single detector. Moreover, if one of the alternate codes is detected, the position sensor will be able to detect which detector has failed and notify an operator of the error.

Figure 6:
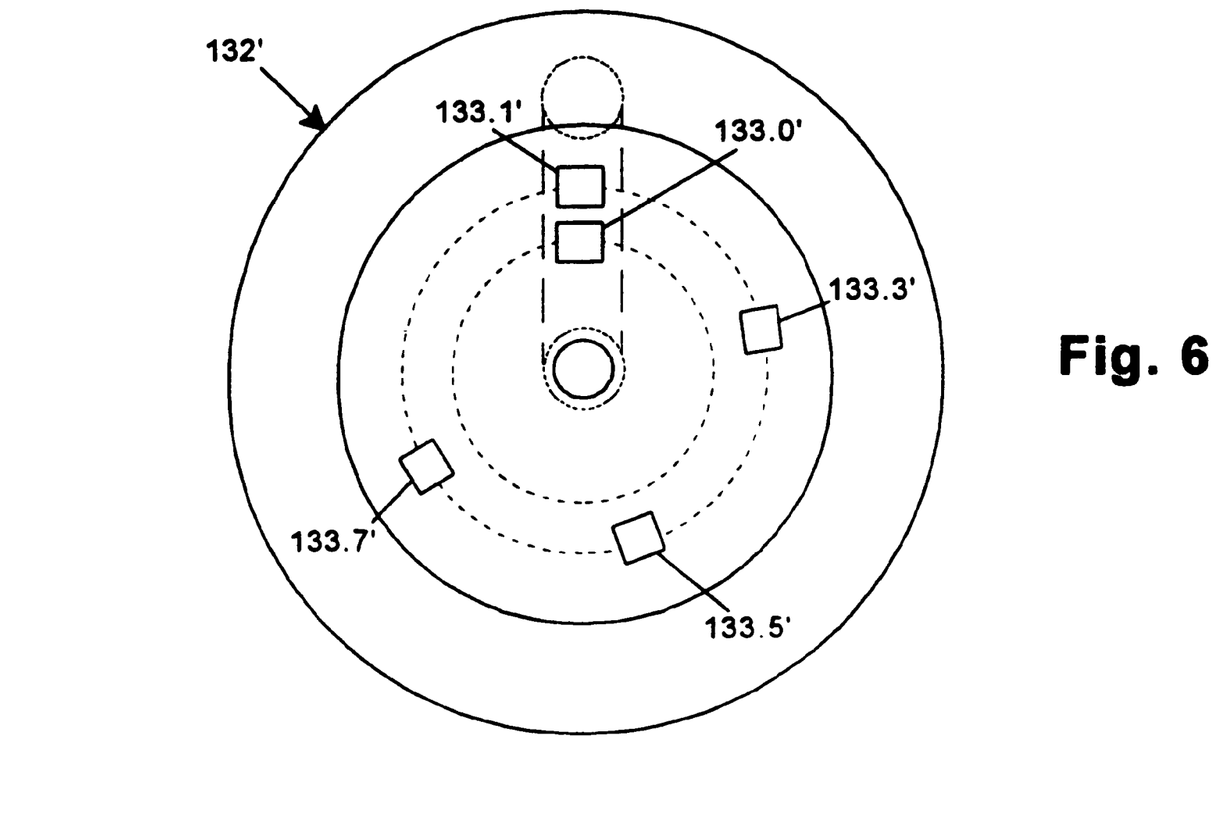
FIG. 6 is a functional top plan view of an alternate magnetic disk to that of FIG. 5(b).

Other combinations of detectors and detectable elements which provide unique sets of codes for each angular position of rotor 120 may be used in the alternative. For example, as shown by FIG. 6, another preferred magnet wheel 132' is illustrated, having magnets 133.1', 133.3', 133.5' and 133.7' spaced over ports 1, 3, 5 and 7, respectively, when the magnet wheel is in a home position. A home magnet 133.0' is also used. Table III below illustrates the state of each detector 136.0–136.9 for each angular position of magnet wheel 132':

TABLE III

Alternate Detector State Chart

| | Detector 136.x | | | | | | | | | | |
|---|---|---|---|---|---|---|---|---|---|---|---|
| Port | 0 | 1 | 2 | 3 | 4 | 5 | 6 | 7 | 8 | 9 | Dec. |
| 1 | 1 | 1 | 0 | 1 | 0 | 1 | 0 | 1 | 0 | 0 | 852 |
| 2 | 0 | 0 | 1 | 0 | 1 | 0 | 1 | 0 | 1 | 0 | 170 |
| 3 | 0 | 0 | 0 | 1 | 0 | 1 | 0 | 1 | 0 | 1 | 85 |
| 4 | 0 | 1 | 0 | 0 | 1 | 0 | 1 | 0 | 1 | 0 | 298 |
| 5 | 0 | 0 | 1 | 0 | 0 | 1 | 0 | 1 | 0 | 1 | 149 |
| 6 | 0 | 1 | 0 | 1 | 0 | 0 | 1 | 0 | 1 | 0 | 330 |
| 7 | 0 | 0 | 1 | 0 | 1 | 0 | 0 | 1 | 0 | 1 | 165 |
| 8 | 0 | 1 | 0 | 1 | 0 | 1 | 0 | 0 | 1 | 0 | 338 |
| 9 | 0 | 0 | 1 | 0 | 1 | 0 | 1 | 0 | 0 | 1 | 169 |

The failure codes for magnet wheel 132' are shown below in Table IV:

TABLE IV

Alternate Detector Failure Codes

| | | Failure - Detector 136.x | | | | | | | | | |
|---|---|---|---|---|---|---|---|---|---|---|---|
| Port | none | 0 | 1 | 2 | 3 | 4 | 5 | 6 | 7 | 8 | 9 |
| 1 | 852 | 340 | 596 | 852 | 788 | 852 | 836 | 852 | 848 | 852 | 852 |
| 2 | 170 | 170 | 170 | 42 | 170 | 138 | 170 | 162 | 170 | 168 | 170 |
| 3 | 85 | 85 | 85 | 85 | 21 | 85 | 69 | 85 | 81 | 85 | 84 |
| 4 | 298 | 298 | 42 | 298 | 298 | 266 | 298 | 290 | 298 | 296 | 298 |
| 5 | 149 | 149 | 149 | 21 | 149 | 149 | 133 | 149 | 145 | 149 | 148 |
| 6 | 330 | 330 | 74 | 330 | 266 | 330 | 330 | 322 | 330 | 328 | 330 |
| 7 | 165 | 165 | 165 | 37 | 165 | 133 | 165 | 165 | 161 | 165 | 164 |
| 8 | 338 | 338 | 82 | 338 | 306 | 338 | 322 | 338 | 338 | 336 | 338 |
| 9 | 169 | 169 | 169 | 41 | 169 | 137 | 169 | 161 | 169 | 169 | 168 |

In the alternate arrangement of magnet wheel 132', it is possible for the same failure code to occur at different ports. Nonetheless, it still may be possible to determine the correct port by using the known direction of movement and the last port position to select between multiple occurrences of a failure code (e.g., if code 42 is received while moving clockwise from port 3, the code most likely represents port 4 and not port 2).

The above arrangement of magnets at positions 1, 3, 5, and 7 also provides the opportunity for different position sensing logic. In particular, by locating magnets at these positions, every detector but one will change in value between adjacent positions. Thus, by monitoring which detector does not change, the port position may usually be found (e.g., when moving between ports 1 and 2, detector 136.9 does not change). Moreover, by monitoring whether more than one detector does not change, detector failures may often be found.

Figure 7:
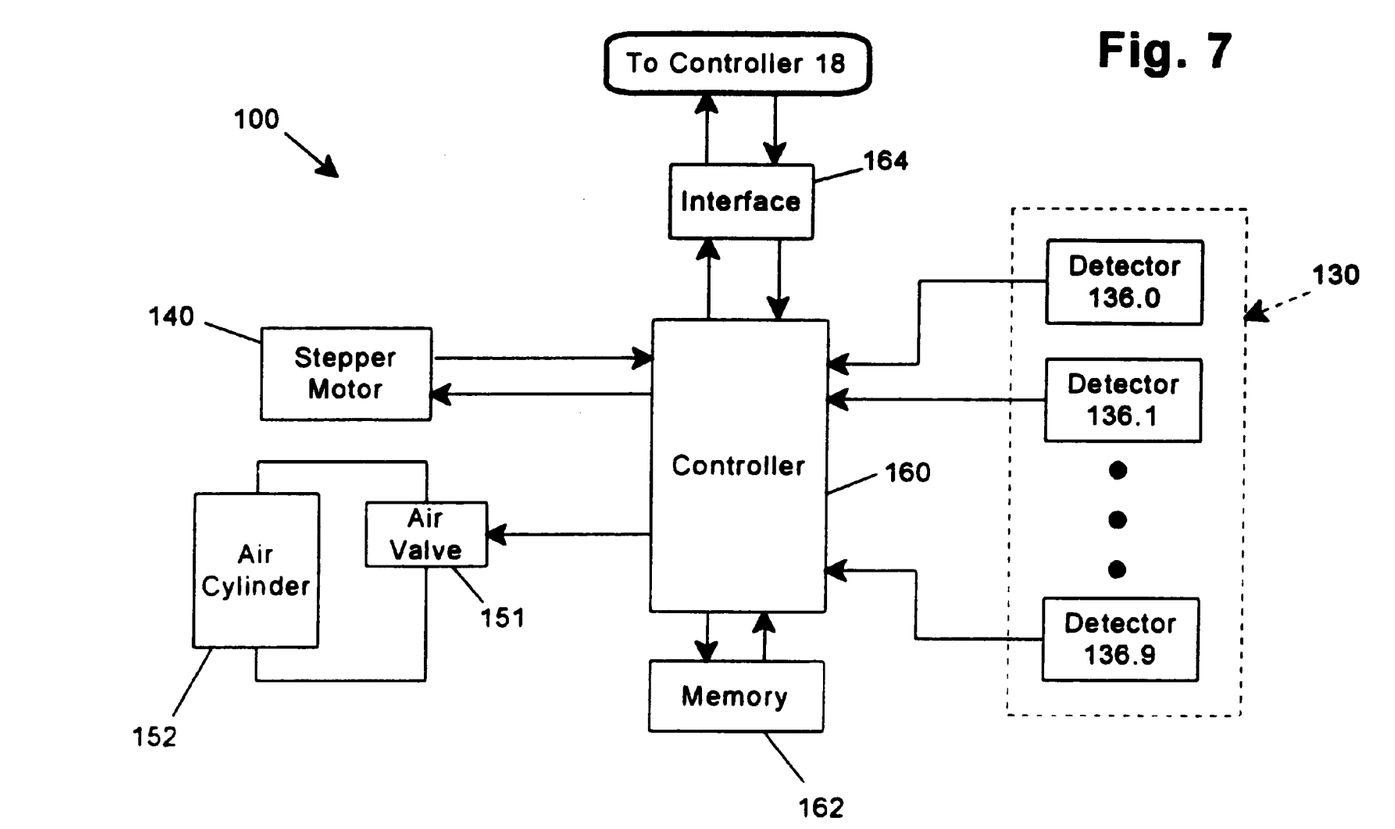
FIG. 7 is a block diagram of the preferred multi-port valve of FIG. 2.

As shown in FIG. 7, multi-port valve 100 is preferably controlled by a separate valve controller 160 having a memory 162 (including RAM and ROM), and interfaced with controller 18 of dispensing system 10 through an interface circuit 164 (preferably a parallel interface). Controller 160 is preferably a Motorola 68HC11 microcontroller, which along with memory 162, interface circuit 164, detector interface circuitry, and other support circuitry (e.g., clocking, power supply, drivers, etc.), is preferably disposed on wiring board 135. In the alternative, the functions of controller 160 may also be incorporated into controller 18.

Controller 160 provides a control signal to stepper motor 140 to rotate rotor 120 to a desired position. Controller 160 also provides a control signal to air valve 151 to selectively apply pressure to opposing ends of air cylinder 152 and thereby raise and lower rotor 120 between its unseated and seated positions. Controller 160 also receives signals from detectors 136.0–136.9 in position sensor 130, both to sense the rotational position of rotor 120 and to determine when the rotor is seated or unseated.

Memory 162 preferably stores the current position of rotor 120. In addition, memory 162 stores a look-up table having the format of Tables II or IV above. In particular, codes are stored in an array indexed by (column, row), where the column indicates failure of a proximity detector (with column 0 indicating no failure), and the row being port position. As will be discussed below, the look-up table is accessed to detect arrival at a destination port by selecting the row representing the destination port, then sequencing through each column in that row to determine if code output by the proximity detectors equals any codes stored in the row.

Figure 8:
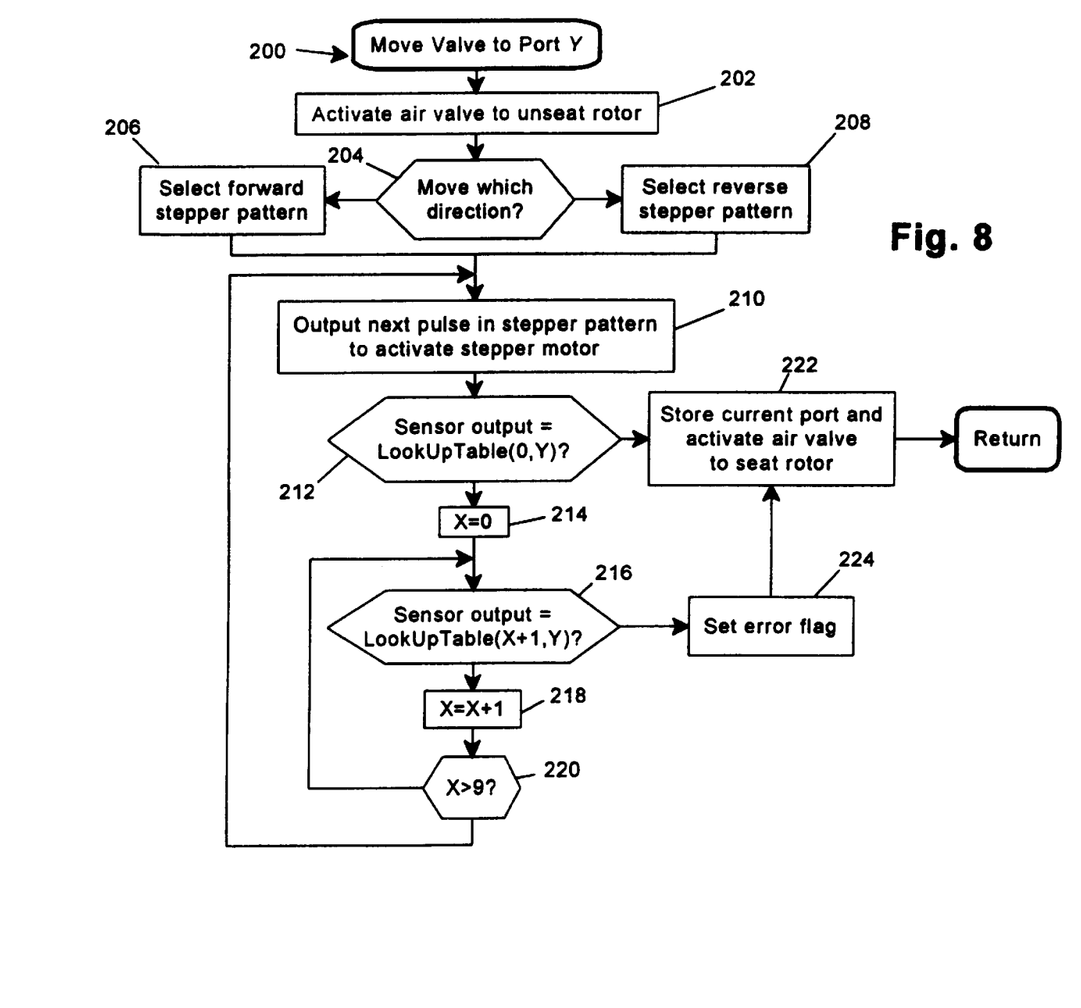
FIG. 8 is a flowchart illustrating the preferred program flow of a valve moving routine executed by the controller in the multi-port valve of FIG. 7.

FIG. 8 illustrates one preferred program flow for a Position Valve routine 200 executed by controller 160. Routine 200 executes in response to a command received from controller 18 to couple input port 114 of valve 100 to a selected output port Y.

Starting with the rotor in an unseated position, air valve 151 is activated in block 202 to apply air pressure to the second end of air cylinder 152 and thereby ensure rotor 120 is in its unseated position.

Next, in block 204, the destination port Y is compared to the current port stored in memory 162 to determine which direction to rotate the rotor to arrive at the destination port the quickest. For example, the test may be if the destination port is more than four ports ahead of the current port rotate counter-clockwise, otherwise rotate clockwise. Depending upon the result of the test, either a forward (clockwise) or reverse (counter-clockwise) stepper pattern is selected in one of blocks 206, 208. The preferred stepper motor is controlled by supplying a sequence of four pulses to the motor. Depending upon the sequence in which the pulses are supplied, the motor may be caused to rotate in either direction. It should be appreciated that the reverse stepper pattern is typically the reverse of the forward stepper pattern.

Once the stepper pattern is selected to rotate the stepper motor in the desired direction, a loop including blocks 210–220 is executed to rotate the stepper motor until the position sensor detects the rotor over the destination port. First, in block 210, the next pulse in the selected stepper pattern is output to the stepper motor to move the stepper motor in the desired direction.

Next, in block 212, the sensor output (the states of proximity detectors 136.0 to 136.9) is compared to the look-up table entry (0, Y), representing the "no failure" code for the destination port Y. If the sensor output equals this code, then rotor 120 has reached the destination port, and thus block 222 is executed to set the current port equal to the destination port and activate the air valve to seat the rotor, before terminating routine 200.

If, however, the sensor output is not equal to the "no failure" code, the other look-up table entries in row Y are searched for a matching code in blocks 214–220. In block 214, a column variable X, which corresponds to the failure code for proximity detector 136.X, is initialized to 0. Next, in block 216, the sensor output is compared to the look-up table entry (X+1, Y), with the one column offset provided to skip the "no failure" column.

If the sensor output equals this code, then rotor 120 has reached the destination port, albeit with a faulty proximity detector indicated. Accordingly, block 224 is executed to set an error flag before passing control to block 222 to set the current port equal to the destination port, activate the air valve to seat the rotor, and terminate the routine.

If the sensor output does not equal the code stored in the current table entry, the column variable X is incremented in block 218. Next, in block 220, if the column variable is less than or equal to 9 (indicating the last column in the table), control is passed to block 216 to evaluate the code stored in the entry in the next column. Otherwise, the entire row has been evaluated, and control passes to block 210 to output the next pulse in the stepper pattern and thereby rotate the stepper motor another step. Routine 200 therefore executes in this manner until the destination port is reached.

Several fault detecting mechanisms may also be incorporated into routine 200. For example, routine 200 may be configured to verify the seated/unseated status of the rotor. Once the rotor is commanded to seat at its desired destination, routine 200 may verify that the sensor pattern is "all off", to indicate that the rotor is indeed seated, and thereafter send a "seated" status message to controller 18. Routine 200 may continue to monitor the sensors and indicate the "seated" status of the rotor. If at any time the sensors indicate that the rotor is not seated, an "unlocked" status message may be sent to controller 18 to handle the action accordingly.

In addition, routine 200 may be configured to handle the situation where the destination port is never reached. Once controller 160 is instructed to move to a new port and determines the direction of shortest travel in block 204, the approximate number of steps necessary to reach the desired destination may be calculated, with this figure used to initiate a "can't move to port" message to be sent to controller 18 if the destination port is not detected in the expected number of steps (plus some allowance).

It should be appreciated that other routines may be executed to utilize position sensor 130 to move rotor to a desired position consistent with the invention.

The preferred position sensor provides significant advantages over prior manners of indicating proof of delivery. For example, the preferred position sensor provides positive verification of position and proof-of-delivery, rather than relying on indirect manners such as conductivity sensors and the like. Moreover, the position sensor is coupled directly to the rotor to sense rotation thereof. It has been found that some conventional designs, which couple a position sensor such as an encoder wheel to a stepper motor, may be subject to errors due to slippage of the motor. Especially in cost sensitive designs, slippage may occur because of the low torque output by smaller stepper motors.

Various modifications may be made to the preferred embodiments without departing from the spirit and scope of the invention. Therefore, the invention lies in the claims hereinafter appended.

What is claimed is:

1. A dispensing system for dispensing chemical products to a plurality of utilization points, the system comprising:
   (a) a mixing apparatus, coupled to a source of diluent and a plurality of sources of chemical products, the mixing apparatus outputting a use dilution having at least one of the plurality of chemical products mixed with diluent;
   (b) a multi-port valve having an input in fluid communication to receive a use dilution from the mixing apparatus and a plurality of outputs coupled to the plurality of utilization points, the multi-port valve being movable between a plurality of positions, each position coupling the input to one of the plurality of outputs; and
   (c) a controller, coupled to the mixing apparatus and the multi-port valve, for selectively dispensing a use dilution to one of the plurality of utilization points.

2. The dispensing system of claim 1, wherein the mixing apparatus comprises:
   (a) a mixing manifold having a diluent input, a plurality of product inputs, and an output; and
   (b) a delivery pump, coupled to the controller, and in fluid communication with the output of the mixing manifold and the input of the multi-port valve.

3. The dispensing system of claim 2, wherein the mixing apparatus further comprises a diluent metering device, coupled to the controller, and in fluid communication with the diluent input of the mixing manifold, the diluent metering device providing a variable rate of flow of diluent to the mixing manifold.

4. The dispensing system of claim 3, wherein the diluent metering device comprises a parallel coupling of diluent entry valves having different sized metering orifices.

5. The dispensing system of claim 3, wherein the mixing apparatus further comprises first and second flowmeters coupled to the controller, the first flowmeter in fluid communication with the diluent input of the mixing manifold, and the second flowmeter in fluid communication with the output of the mixing manifold.

6. The dispensing system of claim 2, wherein the mixing apparatus further comprises a plurality of product valves, coupled to the controller, each product valve in fluid communication with a product source and with the mixing manifold through one of the product inputs.

7. The dispensing system of claim 2, wherein the mixing apparatus further comprises an air push source, coupled to the controller, and in fluid communication with the input of the multi-port valve, for supplying pressurized air to the multi-port valve to deliver use dilution downstream of the air push source to a utilization point.

8. The dispensing system of claim 1, wherein the multi-port valve comprises:

(a) a stator including a first port and a plurality of second ports disposed in an annular arrangement around the first port, the first port in fluid communication with the input of the multi-port valve, and each second port in fluid communication with one of the plurality of outputs of the multi-port valve;

(b) a rotor, rotatably mounted within the housing, and including a central port in fluid communication with a peripheral port, the central port facing the first port of the stator, and the peripheral port facing one of the second ports of the stator; and (c) a drive mechanism, coupled to the rotor, for rotating the rotor to position the peripheral port at a selected one of the second ports to thereby place the first port in fluid communication with the selected second port.

9. The dispensing system of claim 8, wherein the multi-port valve further comprises a position sensor for sensing one of a plurality of predetermined angular positions for the rotor, the position sensor comprising:

(a) a plurality of detectable elements disposed in an annular arrangement;

(b) a plurality of proximity detectors disposed in an annular arrangement, wherein the detectable elements and the proximity detectors are rotatable relative to one another and about a common axis in response to rotation of the rotor such that detectable elements are oriented in proximity to a unique combination of proximity detectors at each predetermined angular position.

10. The dispensing system of claim 9, further comprising a disk coupled to the rotor and rotating cooperatively therewith, wherein the detectable elements comprise magnets mounted to the disk, and wherein the proximity detectors comprise hall-effect detectors opposing the disk and fixedly mounted within the housing.

11. The dispensing system of claim 9, wherein the proximity detectors are evenly spaced from one another with one proximity detector per second port, and wherein the detectable elements are oriented such that the combination of all but one of the proximity detectors activated at any predetermined angular position is unique with respect to the combinations of all proximity detectors activated at other predetermined angular positions and to the combinations of all but one of the proximity detectors activated at other predetermined positions.

12. The dispensing system of claim 11, wherein the plurality of second ports comprises nine second ports, wherein the plurality of proximity detectors comprise nine proximity detectors, and wherein the plurality of detectable elements comprises first, second and third detectable elements, the first detectable element disposed over the first second port, the second detectable element disposed over the third second port, and the third detectable element disposed over the sixth second port when the rotor is oriented with the peripheral port disposed over the first second port.

13. The dispensing system of claim 9, wherein the proximity detectors are evenly spaced from one another with one proximity detector per second port, wherein the plurality of second ports comprises nine second ports, wherein the plurality of proximity detectors comprise nine proximity detectors, and wherein the plurality of detectable elements comprises first, second, third and fourth detectable elements, the first detectable element disposed over the first second port, the second detectable element disposed over the third second port, the third detectable element disposed over the fifth second port, and the fourth detectable element disposed over the seventh second port when the rotor is oriented with the peripheral port disposed over the first second port.

14. The dispensing system of claim 9, wherein the position sensor further comprises a home detectable element and a home proximity detector rotatable relative to one another about the common axis at a different radius from the annular arrangements of detectable elements and proximity detectors, the home detectable element opposing the home proximity detector when the rotor is in a home position.

15. The dispensing system of claim 9, wherein the multi-port valve further comprises a valve controller, coupled to the drive mechanism and the position sensor, for rotating the rotor to one of the predetermined angular positions.

16. The dispensing system of claim 9, wherein the multi-port valve further comprises a rotor lift mechanism for selectively moving the rotor axially between unseated and seated positions, wherein in the seated position, the central port engages the first port and the peripheral port engages one of the second ports, and wherein the plurality of detectable elements are coupled to move axially with the rotor; whereby the plurality of proximity detectors further detect the unseated position of the rotor.

17. A method of dispensing chemical products to a plurality of utilization points, the method comprising the steps of:

(a) forming a use dilution from a diluent and at least one chemical product;

(b) selecting one of a plurality of utilization points by rotating a multi-port valve to place an input thereof in fluid communication with one of a plurality of outputs coupled to the plurality of utilization points; and (c) directing the use dilution through the input of the multi-port valve to the one of the plurality of utilization points.

18. A multi-port valve, comprising:

(a) a housing;

(b) a stator, disposed within the housing, and including a first port and a plurality of second ports disposed in an annular arrangement around the first port;

(c) a rotor, rotatably mounted within the housing, and including a central port in fluid communication with a peripheral port, the central port facing the first port of the stator, and the peripheral port facing one of the second ports of the stator;

(d) a drive mechanism, coupled to the rotor, for rotating the rotor to position the peripheral port at a selected one of the second ports to thereby place the first port in fluid communication with the selected second port; and (e) a position sensor for sensing one of a plurality of predetermined angular positions of the rotor, the position sensor including:

(1) a plurality of detectable elements disposed in an annular arrangement at predetermined angular positions; and (2) a plurality of proximity detectors disposed in an annular arrangement at predetermined angular positions, wherein the detectable elements and the proximity detectors are rotatable relative to one another and about a common axis in response to rotation of the rotor such that detectable elements are oriented in proximity to a unique combination of proximity detectors at each predetermined angular position.

19. The multi-port valve of claim 18, wherein the detectable elements comprise magnets and the proximity detectors comprise hall-effect detectors.

20. The multi-port valve of claim 18, wherein the drive mechanism comprises a shaft coupled to the rotor, wherein the plurality of proximity detectors are mounted in a fixed position within the housing and circumscribing the shaft, wherein the position sensor further comprises a disk coupled to the shaft and disposed in a parallel plane to the plurality of proximity detectors, and wherein the plurality of detectable elements are mounted on the disk.

21. The multi-port valve of claim 20, wherein the drive mechanism further comprises a rotor lift mechanism for selectively moving the rotor and the disk axially between unseated and seated positions, wherein in the seated position, the central port engages the first port and the peripheral port engages one of the second ports; whereby the plurality of proximity detectors detect the unseated position of the rotor.

22. The multi-port valve of claim 21, wherein the rotor includes at least one alignment tip disposed on a surface of the rotor facing the stator and spaced arcuately from the peripheral port, the alignment tip engaging another one of the second ports when the rotor is in the seated position.

23. The multi-port valve of claim 21, wherein the drive mechanism further comprises a stepper motor coupled to the shaft, and wherein the rotor lift mechanism comprises an air cylinder coupled between the shaft and the housing, the air cylinder coupled at each end to a source of pressurized air through a control valve.

24. The multi-port valve of claim 23, wherein the shaft includes a coupler fully engaging the stepper motor with the shaft only in the unseated position.

25. The multi-port valve of claim 18, further comprising a valve controller, coupled to the drive mechanism and the position sensor, for activating the drive mechanism to selectively position the rotor to place the input in fluid communication with a selected output port.

26. The multi-port valve of claim 18, wherein the proximity detectors are evenly spaced from one another with one proximity detector per second port, and wherein the detectable elements are oriented such that the combination of all but one of the proximity detectors activated at any predetermined angular position is unique with respect to the combinations of all proximity detectors activated at other predetermined angular positions and to the combinations of all but one of the proximity detectors activated at other predetermined positions.

27. The multi-port valve of claim 26, wherein the plurality of second ports comprises nine second ports, wherein the plurality of proximity detectors comprises nine proximity detectors, and wherein the plurality of detectable elements comprises first, second and third detectable elements, the first detectable element disposed over the first second port, the second detectable element disposed over the third second port, and the third detectable element disposed over the sixth second port when the rotor is oriented with the peripheral port disposed over the first second port.

28. The multi-port valve of claim 18, wherein the proximity detectors are evenly spaced from one another with one proximity detector per second port, wherein the plurality of second ports comprises nine second ports, wherein the plurality of proximity detectors comprises nine proximity detectors, and wherein the plurality of detectable elements comprises first, second, third and fourth detectable elements, the first detectable element disposed over the first second port, the second detectable element disposed over the third second port, the third detectable element disposed over the fifth second port, and the fourth detectable element disposed over the seventh second port when the rotor is oriented with the peripheral port disposed over the first second port.

29. The multi-port valve of claim 18, wherein the position sensor further comprises a home detectable element and a home proximity detector rotatable relative to one another about the common axis at a different radius from the annular arrangements of detectable elements and proximity detectors, the home detectable element opposing the home proximity detector when the rotor is in a home position.

30. A position sensor for sensing one of a plurality of predetermined angular positions of a first member rotatably coupled to a second member, the position sensor comprising:

(a) a plurality of detectable elements disposed in an annular arrangement on one of the first and second members; and (b) a plurality of proximity detectors disposed in an annular arrangement on the other of the first and second members, wherein the detectable elements and the proximity detectors are rotatable relative to one another about a common axis in response to rotation of the first member relative to the second member such that detectable elements are oriented in proximity to a unique combination of proximity detectors at each predetermined angular position.

31. The position sensor of claim 30, wherein the proximity detectors are evenly spaced from one another with one proximity detector per predetermined angular position, and wherein the detectable elements are oriented such that the combination of all but one of the proximity detectors activated at any predetermined angular position is unique with respect to the combinations of all proximity detectors activated at other predetermined angular positions and to the combinations of all but one of the proximity detectors activated at other predetermined positions.

32. The position sensor of claim 31, wherein the plurality of predetermined angular positions comprises nine predetermined angular positions, wherein the plurality of proximity detectors comprises nine proximity detectors, and wherein the plurality of detectable elements comprises first, second and third detectable elements, the first detectable element disposed at the first predetermined angular position, the second detectable element disposed at the third predetermined angular position, and the third detectable element disposed at the sixth predetermined angular position.

33. The position sensor of claim 30, wherein the proximity detectors are evenly spaced from one another with one proximity detector per second port, wherein the plurality of predetermined angular positions comprises nine predetermined angular positions, wherein the plurality of proximity detectors comprises nine proximity detectors, and wherein the plurality of detectable elements comprises first, second, third and fourth detectable elements, the first detectable element disposed at the first predetermined angular position, the second detectable element disposed at the third predetermined angular position, the third detectable element disposed at the fifth predetermined angular position, and the fourth detectable element disposed at the seventh predetermined angular position.

34. The position sensor of claim 30, further comprising a home detectable element and a home proximity detector rotatable relative to one another about the common axis at a different radius from the annular arrangements of detectable elements and proximity detectors, the home detectable element opposing the home proximity detector when the first member is in a home position.

35. The position sensor of claim 30, wherein the detectable elements comprise magnets and the proximity detectors comprise hall-effect detectors.

* * * * *